April 3, 1951   R. M. HEINTZ ET AL   2,547,465
CRANKSHAFT BEARING ASSEMBLY
Filed March 21, 1946
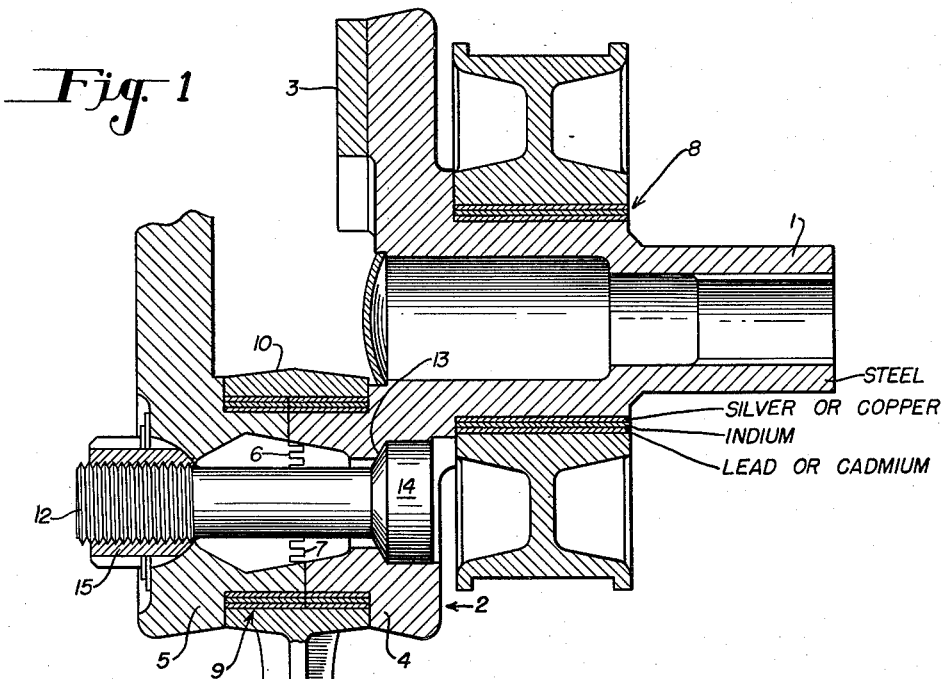
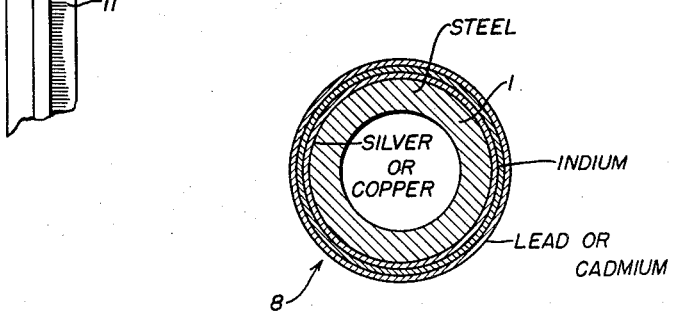
INVENTORS
RALPH M. HEINTZ
JOHN W. FRAZIER
BY LEONARD J. KOCH
*Frank H. Harmon*
ATTORNEY Patented Apr. 3, 1951

2,547,465

UNITED STATES PATENT OFFICE 2,547,465

CRANKSHAFT BEARING ASSEMBLY

Ralph M. Heintz, Cleveland, John W. Frazier, Shaker Heights, and Leonard J. Koch, Cleveland, Ohio, assignors to Jack & Heintz Precision Industries, Inc., Cleveland, Ohio, a corporation of Delaware Application March 21, 1946, Serial No. 656,046

3 Claims. (Cl. 308—237)

This invention relates in general to shaft and bearing construction and more particularly to improvements in the construction and method of making of the main and connecting rod bearings for an engine crankshaft and is a continuation-in-part of the application for United States Letters Patent of Ralph M. Heintz, Serial No. 639,224, for Crankshaft Bearing, filed January 5, 1946, now abandoned.

One of the primary objects of the invention is to provide directly upon the engine crankshaft, of steel or cast iron, all of the main and connecting rod bearings, the bearings to be bonded to the crankshaft and consisting of selected metals bonded together and onto the crankshaft in such a manner as to inherently enhance corrosion resistance, relative hardness and wearing characteristics of the bearings and which bearings will be capable of withstanding high bearing loads at high operating speeds over long periods of time.

Another object is to provide an improved method of economically and successfully producing uniform plain bearings of this character.

With the foregoing and other objects in view the invention resides in the combination of parts and in the details of construction hereinafter set forth in the following specification and appended claims, certain embodiments thereof being illustrated in the accompanying drawings, in which:

Figure 1 is a view in longitudinal section of a gas engine showing one crank pin with its two parts joined together and held by a bolt, the main and connecting rod bearings being bonded to the crankshaft; and Figure 2 is a view in cross section of the main crankshaft.

Referring more particularly to the drawings, the hollow crankshaft 1 is provided with the usual crank throw 2 extended to have attached thereto a counterweight 3 to equalize unbalanced forces in the crankshaft when assembled. The crank throw 2 carries a crank pin made of two complementary parts 4 and 5 which are provided with interlocking end splines 6 and 7.

The crankshaft may be formed of any suitable metal such as steel or cast iron to which are suitably bonded the main and connecting rod bearings.

In the preferred embodiment of the present invention the main and connecting rod bearings which are bonded directly to the exterior of the crankshaft as a backing member each consist of three metals, namely, silver or copper, indium and either lead or cadmium. Silver and copper are relatively hard metal bearing surfaces of high heat conducting characteristics and either may be used as the initial layer to be bonded directly to the crankshaft. An intermediate layer of indium is then bonded to the initial layer of silver or copper. A layer of soft bearing metal such as lead or cadmium is then bonded to the layer of indium.

The preferred method of constructing a bearing of this character contemplates the diffusion of the layer of indium into the inner relatively hard silver or copper bearing metal and into the outer layer of relatively soft lead or cadmium. Generally, this may be accomplished by heating the composite assembled bearing, after being bonded to the crankshaft, at a temperature above the approximate melting point of indium (310° F.) but below the melting point of the other two bearing metals, silver or copper, and lead or cadmium, for a sufficient length of time to cause the indium to diffuse partially or completely into both the silver or copper and lead or cadmium bearing metals. It is to be understood that instead of resorting to the actual heating process, the heat incident to the operation of the engine may in some cases be sufficient to cause the indium to be properly diffused for the intended purpose.

The proportions of indium and lead or cadmium are such that the diffusion temperature and time of application of heat are preferably controlled to insure complete diffusion through the inner layer of silver or copper and the outer layer of lead or cadmium bearing metal and the outer layer of lead or cadmium. The area of greatest diffusion of indium occurs at the common bond of the two other bearing metals with the indium. This increased hardness and corrosion resistance which the diffused indium imparts to the bearing metals is at a maximum at this point and decreases gradually away from this point.

The initial bearing layer of silver or copper should preferably be of a metal containing at least 50% silver. The intermediate layer of indium should be at least .05% of the initial bearing layer by weight and the soft layer of lead or cadmium should not be more than 10% of the silver or copper bearing layer by weight.

The bearing resulting from this selection and arrangement and bonding of metals onto the crankshaft and method employed results in a bearing in which the bearing properties of the primary lead or cadmium bearing metal improves as the bearing wears and in which the silver or copper bearing metal is improved by increased hardness, wearability and corrosion resistance. Under severe loading this insures an improved bearing surface after the soft bearing metal has been worn off. Moreover, the nature of the method of construction of the bearing lends itself to economic and successful production of uniform bearings of this character.

The purpose of such bonded bearings is to provide the main crankshaft and crank pin portions of the crankshaft with an integral exterior bearing surface, such as generally shown respectively at 8 and 9, and that will function respectively as a suitable main bearing on the crankshaft for the cylinder block crankshaft support and a connecting bearing for the integral loop end 10 of the connecting rod 11.

The preferable manner of assembly is to place the loop 10 of the connecting rod 11 over the bearing 9 of one crank pin part 4 after which the other similarly coated crank pin part 5 is forced into the loop 10 until the two sets of splines 6 and 7 are fully meshed.

The crank pin receives a retaining screw bolt 12 to hold the two parts 4 and 5 of the crank pin in assembled position within the connecting rod loop in which the crank pin with its superimposed bonded bearing is free to rotate. The crank throw 2 is provided with a beveled seat 13 to receive the correspondingly beveled head 14 of a screw bolt 12. The bolt head may also be provided with a suitably splined locking nut 15 for locking it against rotation.

From the foregoing discussion of the construction and manner of assembly of parts it will be seen that the bearings bonded onto the crank pin portions of the crankshaft to be an integral part thereof, are relatively loosely engaged by the one piece cap of the connecting rod makes for ease of construction involving a minimum of parts. The assembly of the two component parts of the crank pin are easily assembled and disassembled by a single bolt and nut. Moreover the breaking down of the crankshaft into three parts, by reason of the two composite crank pins, renders each part replaceable and interchangeable. In operation the crank pin is relieved of any possible friction or scoring inasmuch as it rotates and the same is true of main crankshaft portions. The nature of the bonded bearings is such that makes replacement unnecessary. The necessity for adjustment shims for bearing clearance adjustments is also dispensed with.

We claim:

1. An anti-friction connecting rod bearing for a rigid metal engine crankshaft, said bearing comprising a layer of relatively hard non-corrosive resistant bearing metal bonded to said shaft, a layer of indium on said layer of hard bearing metal and a layer of relatively soft non-corrosive resistant bearing metal on said layer of indium, said indium being diffused by heat into both said hard and soft bearing metals.

2. An anti-friction connecting rod bearing for a rigid metal engine crankshaft, said bearing consists of a layer of silver bearing metal bonded to said crankshaft, an intermediate layer of indium on said layer of silver bearing metal and a layer of relatively soft non-corrosive resistant bearing metal on said indium layer, said indium layer being diffused by heat into both said silver and soft bearing metals.

3. An anti-friction connecting rod bearing for a rigid metal engine crankshaft, said bearing consisting in a layer of silver bearing metal bonded to said shaft, a layer of indium bonded onto said layer of silver bearing metal and a layer of lead bearing metal on said layer of indium, said indium being diffused by heat into said silver and lead bearing metals.

RALPH M. HEINTZ.
JOHN W. FRAZIER.
LEONARD J. KOCH.

REFERENCES CITED

The following references are of record in the file of this patent:

UNITED STATES PATENTS

| Number | Name | Date |
| --- | --- | --- |
| 718,141 | Monson | Jan. 13, 1903 |
| 882,138 | Brinton | Mar. 17, 1908 |
| 2,289,572 | Underwood | July 14, 1942 |
| 2,448,369 | Heintz et al. | Aug. 31, 1948 |

FOREIGN PATENTS

| Number | Country | Date |
| --- | --- | --- |
| 663,789 | Germany | Aug. 13, 1938 |